United States Patent
Osada

[19]

[11] Patent Number: 6,111,889
[45] Date of Patent: *Aug. 29, 2000

[54] MASTER-SLAVE DATA COMMUNICATION SYSTEM

[75] Inventor: Tomio Osada, Kanagawa, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/013,627

[22] Filed: Jan. 26, 1998

Related U.S. Application Data

[63] Continuation of application No. 08/448,636, May 23, 1995, abandoned.

[30] Foreign Application Priority Data

Jul. 22, 1994 [JP] Japan .................................. 6-171179

[51] Int. Cl.[7] ........................................ H04J 3/02
[52] U.S. Cl. .................... 370/461; 370/449; 370/444; 340/825.08; 340/825.5
[58] Field of Search ................ 340/825.5, 825.51, 340/825.52, 825.07, 825.08; 370/455, 449, 461, 443, 444

[56] References Cited

U.S. PATENT DOCUMENTS

| | | |
|---|---|---|
| 4,586,040 | 4/1986 | Akiba et al. . |
| 4,924,461 | 5/1990 | Amemiya et al. . |
| 4,951,281 | 8/1990 | Muto et al. . |
| 5,132,680 | 7/1992 | Tuzeda et al. . |
| 5,166,675 | 11/1992 | Amemiya et al. . |
| 5,355,368 | 10/1994 | Dore et al. . |
| 5,363,370 | 11/1994 | Abiven . |
| 5,539,743 | 7/1996 | Amemiya et al. . |

FOREIGN PATENT DOCUMENTS

| | | |
|---|---|---|
| 2004934 | 12/1989 | Canada . |
| 2010866 | 2/1990 | Canada . |
| 2042037 | 9/1990 | Canada . |
| 0117832 | 9/1984 | European Pat. Off. . |
| 0372567 | 6/1990 | European Pat. Off. . |
| 0385431 | 9/1990 | European Pat. Off. . |
| 0444207A1 | 9/1990 | European Pat. Off. . |
| 0444207 | 9/1991 | European Pat. Off. . |
| 2177873 | 1/1987 | United Kingdom . |

OTHER PUBLICATIONS

Siemens "Ics for Communications" IOM–2 Interface Reference Guide, Jan., 1990.

*Primary Examiner*—Edwin C. Holloway, III
*Attorney, Agent, or Firm*—Rothwell, Figg, Ernst & Manbeck, P.C.

[57] ABSTRACT

Upward/downward data arranged in a time-division multiplexed frame, including a common subchannel for priority transmission and private subchannels for transmission request/enable signals, are exchanged via an upward/downward data signal line between a plurality of slave stations and a master station having a priority circuit and an internal communication device. A slave station establishes the transmission request signal and transmits it to the priority circuit through the upward data signal line. The priority circuit selects one transmission request signal to assign priority for transmission to a corresponding slave station and then establishes the transmission enable signal and transmits it through the downward data signal line based on the selected signal. When the signal is acknowledged, the corresponding slave station establishes a message signal and transmits to the master station through the upward data signal line.

23 Claims, 10 Drawing Sheets

PRIOR ART

MASTER-SLAVE DATA COMMUNICATION SYSTEM

This is a continuation of application Ser. No. 08/448,636 filed May 23, 1995, now abandoned.

BACKGROUND OF THE INVENTION

1. Field of the Invention

The present invention relates to an inter-device or intra-device data communication system where data are exchanged between a master station and a plurality of slave stations.

2. Description of the Related Art

FIG. 9 shows a conventional IOM-2 system (ISDN Oriented Modular Interface) based point-multipoint data communication system having a master station and a plurality of slave stations. The IOM-2 system is detailed in "ICs for Communications—IOM-2 Interface Reference Guide" published by semiconductor group, Siemens Aktiengesellschaft, Ordering No. B115-B6161-X-X-7600 Printed in Germany TS 01905. IOM-2 is a registered trademark of Siemens AG.

Referring to the figure, a master station 19 has a plurality of internal master communication devices 1-1 through 1-8, each of which corresponds to one of slave communication devices 2-1 through 2-8 in slave stations. The respective slave stations are coupled to the master station via communication channels of a Frame Synchronization Clock (FSC) line 3, a Data Clock (DCL) line 4, a Data Downstream (DD) line 5 with a pull-up resister 8 and a Data Upstream (DU) line 6 with a pull-up resister 9. The respective communication channels couple one of the internal master communication devices 1-1 through 1-8 to a corresponding one of the slave communication devices 2-1 through 2-8. The master station is also connected with a microprocessor 7.

FIG. 10 shows a timing diagram illustrating conventional transmission frame formats of data based on IOM-2 system.

Referring to the figure, a frame format 10 depicts a typical signal format in a signal subchannel among a plurality of signal subchannels IOM CH0 through IOM CH7. The frame format 10 is a common frame format to both upward and downward data transmitted via the Data Upstream DU and Data Downstream DD lines.

The signal frame format 10 is composed of two eight-bit B-channels B1 and B2 for user data, an eight-bit Monitor for message elements, a six-bit C/I and two one-bits of MR and MX for other data. C/I indicates an internal/external status of a master/slave communication device and indicates an instruction to the other side of the master-slave communication device of an operation. A total capacity of the signal frame format 10 is 32 bits, and therefore, that of a frame with eight signal subchannels of the eight slave stations is 256 bits, the calculation of which is as follows:

8 bits×4 data fields×8 subchannels=256 bits

According to the IOM-2 system based conventional point-multipoint data communication system, the master station 19 outputs an 8 (eight) KHz single-cyclic frame synchronization clock signal to the Frame Synchronization Clock (FSC) line 3 and a 4.096 MHz data clock signal to the Data Clock (DCL) line 4. The master station exchanges data privately with the respective slave stations via corresponding signal subchannels on the Data Upstream and Downstream lines 5 and 6. The signal subchannels IOM CH0 through IOM CH7, each of which has an eighth time period of the single-cyclic frame synchronization clock signal on the Frame Synchronization Clock (FSC) line 3, are provided for transmitting data privately between the respective internal master communication devices 1-1 through 1-8 and corresponding slave communication devices 2-1 through 2-8.

Thus, in this conventional system, a transmission frame of 256 bits is exchanged between the master station and the slave stations in the point-multipoint communication system. In this case, a transmission speed of 2 Mbps is required in a data transmission system, as the following calculation shows.

256 bits÷125 μS=2 Mbps

That transmission speed, however, would cause a transmission overload problem in such a situation as a plurality of slave stations operating with the maximum working capacity are trying to communicate with a single master station in the conventional system. A solution to this problem is, therefore, that a plurality of internal communication circuits must be added to the master station so that the number of the internal communication circuits may even the number of slave stations for a normal communication. This solution, however, leaves a problem of higher production cost and larger scale or space of a data transmission system.

The present invention is to solve this and other problems. An object of the invention is to provide a point-multipoint data communication system to achieve an effective data communication between a master station having a single internal communication circuit and a plurality of slave communication circuits by way of the smallest number of signal channels required in the system.

SUMMARY OF THE INVENTION

This and other objects are accomplished by the following aspects of the present invention.

According to one aspect of the present invention, a master-slave data communication system in which transmission data, arranged on a transmission data multiple access frame, are exchanged between a master station and a plurality of slave stations by way of a transmission data access channel, each of the plurality of slave stations may include a communication device for generating a status signal arranged in a private subchannel of the transmission data multiple access frame and for issuing the transmission data for priority transmission on a common subchannel on the transmission data multiple access frame, and the master station may include a prioritizing device for controlling data transmission, the prioritizing device selecting one of a plurality of the status signals from the respective slave stations and assigning a corresponding one of the plurality of slave stations the priority transmission based on a selected one of the status signals.

According to another aspect of the present invention, a master-slave data communication system in which transmission data are exchanged between a master station and a plurality of slave stations, the master-slave data communication system may include an upward data signal line coupling the master station to the plurality of slave stations for transmitting upward data arranged on an upward data frame from each of the plurality of slave stations to the master station, the upward data frame including an upward data message signal and a transmission request signal, and a downward data signal line coupling the master station to the plurality of slave stations for transmitting downward data arranged on a downward data frame from the master station to each of the plurality of slave stations, the downward data frame including a downward data message signal and a transmission enable signal.

According to another aspect of the present invention, a master-slave data communication system having a master station and a plurality of slave stations, the system may include a common data signal line coupling the master station to the plurality of slave stations, for transmitting time-division multiplexed upward data signals on an upward data frame from each of the plurality of slave stations to the master station, and for transmitting time-division multiplexed downward data signals on a downward data frame from the master station to one of the plurality of slave stations.

According to another aspect of the present invention, a method of transmitting data between a master station and a plurality of slave stations with transmission data in a master-slave data communication system, the method may include the steps of establishing a transmission request signal on one of a plurality of private upward data transmission subchannels on an upward data frame in one of the plurality of slave stations, transmitting the upward data frame including the transmission request signal to the master station via an upward data signal line, selecting one of the plurality of slave stations based on the transmission request signal on the upward data frame input in the master station, establishing a transmission enable signal on one of a plurality of private downward data transmission subchannels corresponding to a selected one of the plurality of slave stations on a downward data frame in the master station, transmitting the downward data frame including the transmission enable signal to the selected slave station via a downward data signal line, establishing a message signal of the transmission data on a common upward data transmission subchannel shared by the plurality of slave stations on the upward data frame when the selected slave station acknowledges the transmission enable signal via a corresponding one of the private downward data transmission subchannels, and transmitting the message signal to the master station via the upward data signal line.

According to another aspect of the present invention, a method for communicating between a first slave station of a plurality of slave stations and a master station, the method may include the steps of dividing each of a series of time periods into each of a plurality of private time slots that respectively correspond to the plurality of slave stations, and a data time slot, activating, by the first slave station, a transmit request signal during the first private time slot of a first time period, activating, by the master station, a transmit enable signal during the first private time slot of a second time period, and transmitting slave data from the first slave station to the master station during the data time slot of the second time period.

DESCRIPTION OF THE PREFERRED EMBODIMENTS

Embodiment 1.

The present invention is directed to a master-slave data communication system having a master station and a plurality of slave stations. The number of slave stations herein referred to is three in order to make the discussion simple, but the invention is not limited in this respect. According to this embodiment of the present invention, data transmitted in the system are basically arranged in a time-division multiplexed frame including eight bits of message signals followed by a plurality of, herein referred to is three, one-bits of status signals from/to the respective slave stations to/from a master station. A frame format of upward data includes a transmission request signal as a status signal transmitted from the respective slave station to a master station. A frame format of downward data includes a transmission enable signal to the respective slave stations from a master station.

Figure 1:
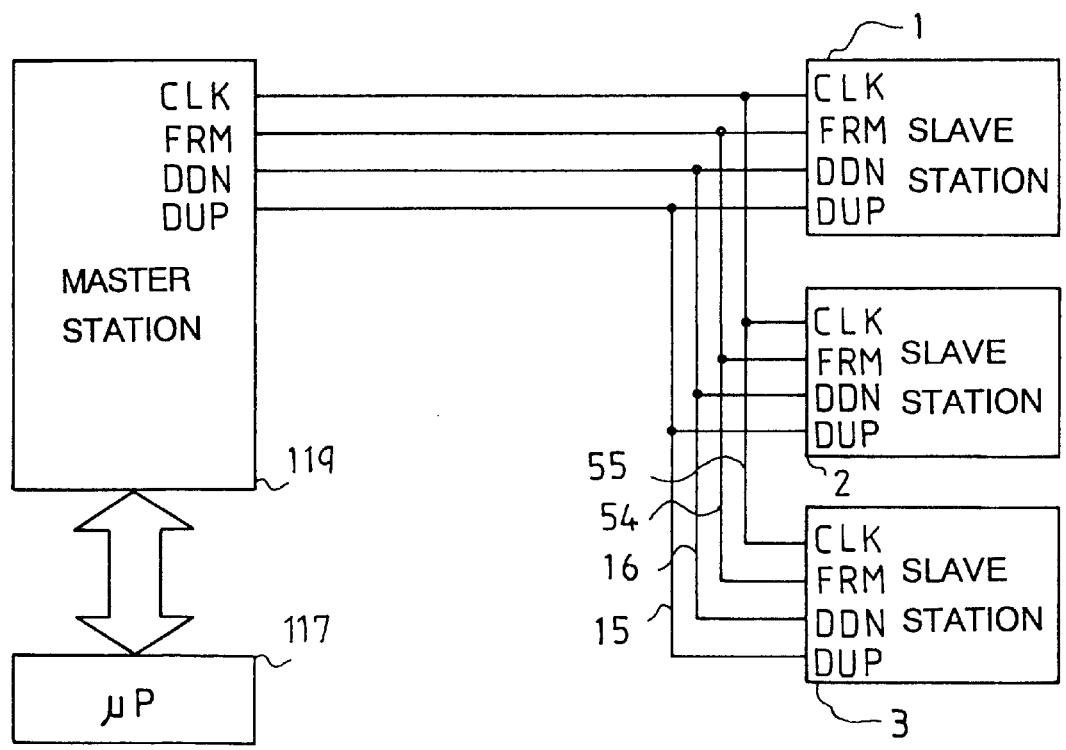
FIG. 1 is a block diagram of a master-slave data communication system according to a first embodiment of the present invention.

FIG. 1 is a block diagram of a master-slave data communication system of the present invention according to an embodiment, including a master station 119, slave stations 1, 2 and 3, a microprocessor or µP 117, a frame signal line (FRM) 54, a clock signal line (CLK) 55, an upward data signal line (DUP) 15 and a downward data signal line (DDN) 16.

Figure 2:
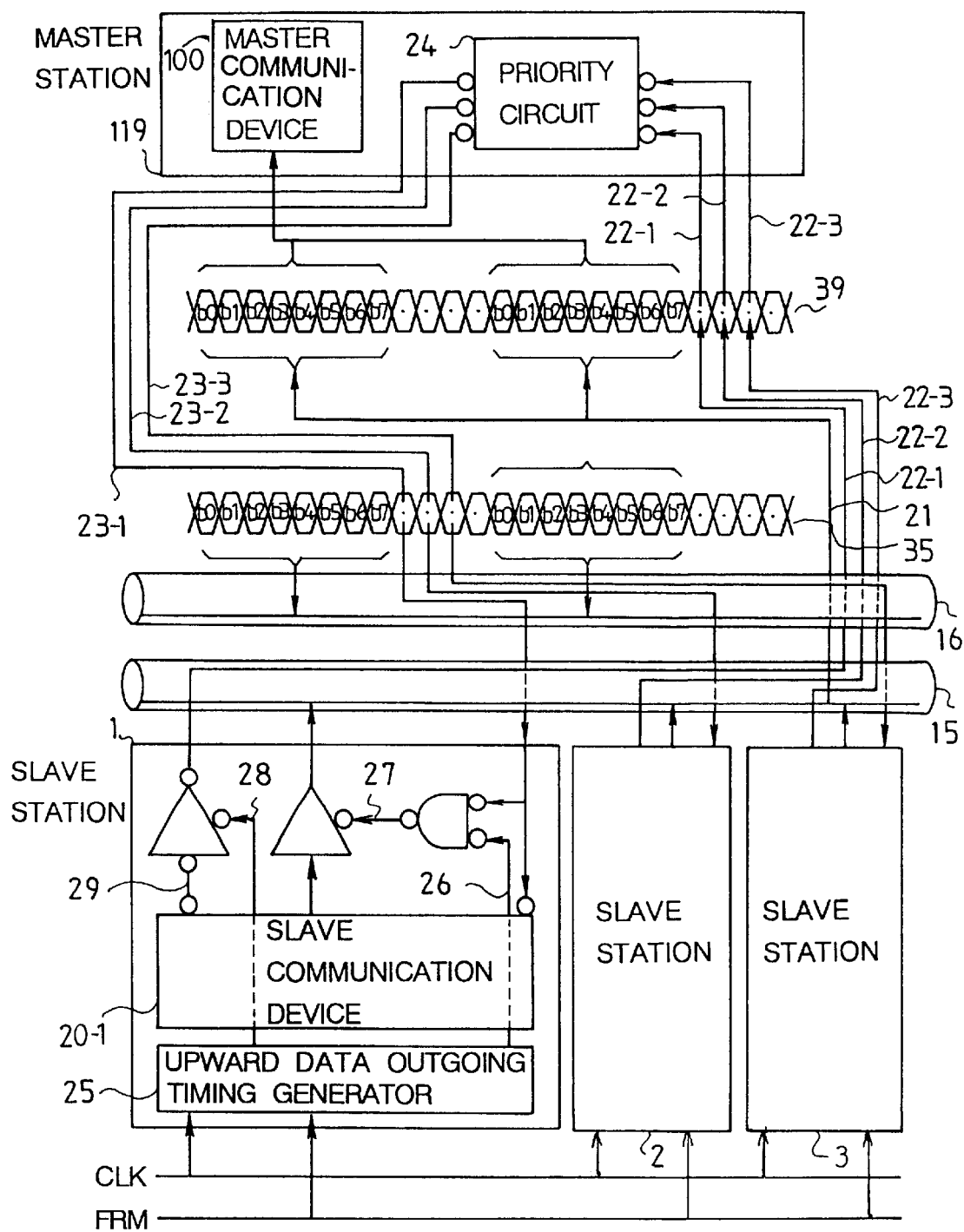
FIG. 2 is a detailed diagram of the master-slave data communication system of FIG. 1 illustrating transmission frame formats of upward and downward data transmitted between the master station and the respective slave stations and a relating signaling network based on wired logic in the system.

FIG. 2 is a detailed diagram of the master-slave data communication system of FIG. 1 illustrating transmission frame formats of upward and downward data transmitted between the master station and the respective slave stations and a relating signaling network based on wired logic in the system.

Referring to the figure, the master station 119 includes a master communication device 100 and a priority circuit 24 for a priority transmission. The slave station 1, as a typical example of the slave stations in the system, has a slave communication device 20-1 issuing a transmission request status signal 29. The slave station 1 has an upward data outgoing timing generator 25 for issuing an upward data outgoing timing signal 26 and a transmission request status outgoing timing signal 28. An upward data outgoing enable signal 27 is also generated in the slave station. An upward data transmission channel 21 in connection with an upward data format 39 show the flow of upward data in a transmission frame transmitted through the upward data signal line 15 from the respective slave stations to the master communication device 100. The priority circuit 24 receives transmission request signals 22-1-22-3 from a plurality of the slave stations 1, 2 and 3 via the upward data signal line 15 and selects one of the transmission request signals 22-1-22-3 for a priority transmission. The priority circuit 24 transmits a corresponding one of transmission enable signals 23-1-23-3 based on the selected transmission request signal to a corresponding one of the slave stations via downward data format 35 through the downward data signal line 16.

The upward and downward data formats 35 and 39 of FIG. 2 illustrate the data transmission mechanism based on an inventive time-division multiplexed transmission frame, in which message data of the respective slave stations are transmitted via a common transmission subchannel and status signals such as the transmission request and enable signals are transmitted via private transmission subchannels provided for the respective slave stations.

Figure 3:
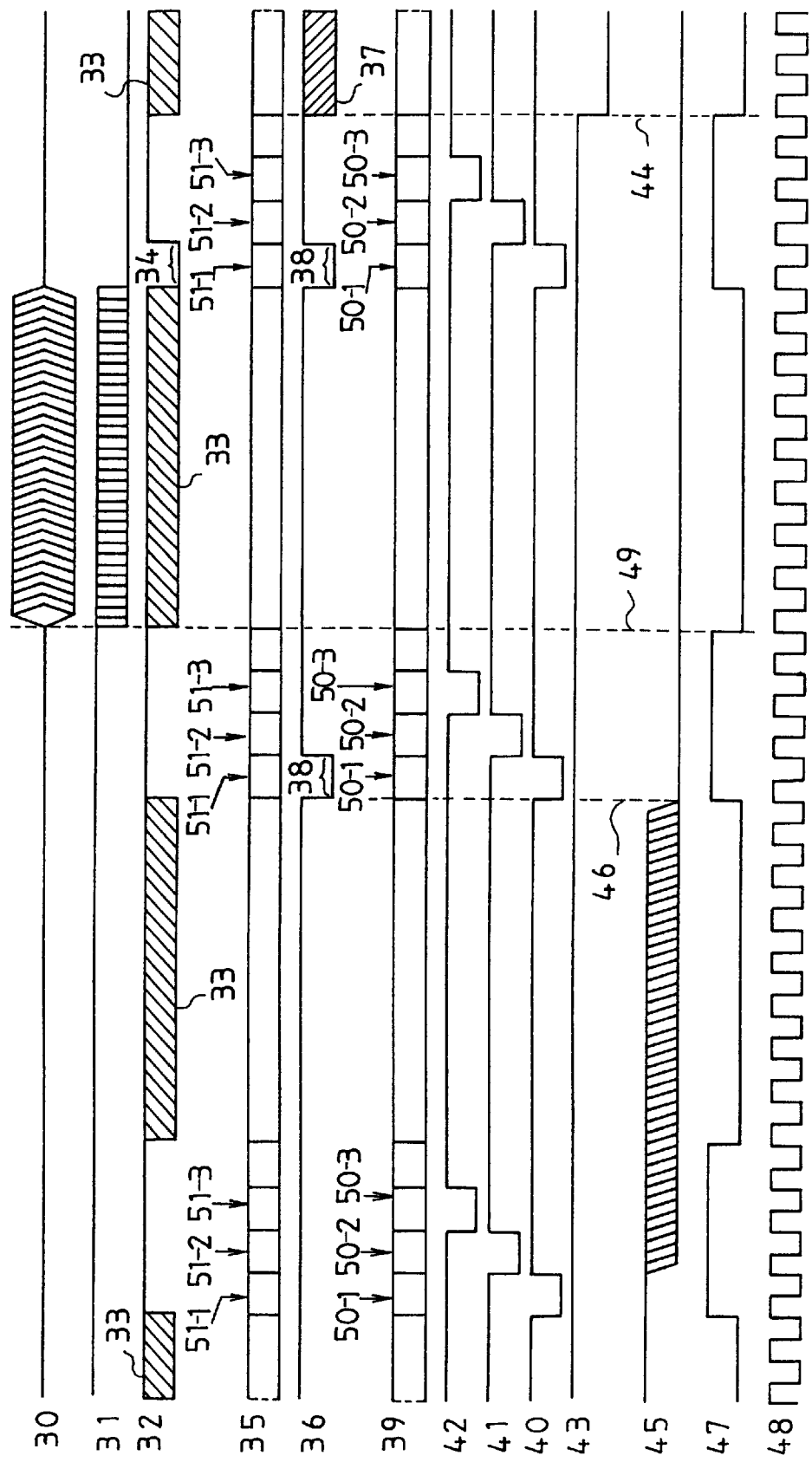
FIG. 3 is a timing diagram illustrating an initial operation of data transmission between the master station and the slave station 1 in the master-slave data communication system of FIG. 1 according to the first embodiment.

FIG. 3 is a timing diagram illustrating an initial operation of data transmission in the system of FIGS. 1 and 2 according to this embodiment discussing data communication. An exemplary data transmission discussed with reference to this timing diagram is a series of operations for transmitting data in the slave station 1 to the master station.

The timing diagram depicts the timing of signals mainly of the slave station 1 in relation to relevant data to the exclusive data transmission, including a priority operation status 30, the upward data format 39 with an upward data signal waveform 36 and the downward data frame 35 with a downward data signal waveform 32. A transmission enable signal 31 is output to the slave station 1 from the priority circuit 24 which corresponds to the transmission enable signal 23-1 of FIG. 2. The downward data signal waveform 32 shows message elements 33 and a transmission enable signal element 34 transmitted to the slave station 1. The upward data signal waveform 36 shows a message element 37 and transmission request signal elements 38, both of which are issued from the slave station 1.

Further, the timing diagram illustrates signals output from the slave station 1 including a transmission request outgoing enable signal 40, an upward data outgoing enable signal 43, a transmission request signal 45, a message element outgoing timing signal 47, and a clock signal 48. The transmission request outgoing enable signal 40 corresponds to the transmission request status outgoing timing signal 28 of FIG. 2. The upward data outgoing enable signal 43 corresponds to the upward data outgoing enable signal 27 of FIG. 2. The transmission request signal 45, corresponding to the transmission request status signal 29 of FIG. 2, is issued by the slave communication device 20-1 of FIG. 2. A message outgoing timing 44 is a start timing of message element transmission after the transmission request signal 45 is acknowledged. The message element outgoing timing signal 47, corresponding to the upward data outgoing timing signal 26 of FIG. 2, supplies a series of common start timing pulses of message element transmission to all of the slave stations. The clock signal 48 corresponds to the clock signal of FIG. 2. The timing diagram also shows transmission request outgoing enable signals 41 and 42 of the slave stations 2 and 3, respectively, for reference in connection with the downward and upward data frames 35 and 39 including the transmission request outgoing enable signal 40 of the slave station 1. The transmission request outgoing enable signals 41 and 42 correspond, respectively, to the transmission request status outgoing timing signals 28 of the slave stations 2 and 3.

Frame signals in the upward data format 39 of FIG. 2 or 3 on the upward data signal line 15 are transmitted in a synchronized manner with a cyclic frame signal on the frame signal line 54 of FIG. 1.

According to FIG. 3, the upward data format 39 is composed of a series of upward data transmission frames, each of which includes a message data subchannel and a series of transmission subchannels or time slots 50-1, 50-2 and 50-3. The time slots 50-1 through 50-3 are private transmission subchannels of the respective slave stations 1 thorough 3. Each of the time slots is also defined as a transmitting timing of the transmission request status signal 29 from a corresponding one of the slave stations to the master station through the upward data signal line 15. An upward data transmission frame is designated in the upward data format 39 by a time period just after a series of time slots 50-1 through 50-3 until the end of another consecutive series of the time slots 50-1 through 50-3.

Similarly, the downward data format 35 is composed of a series of downward data transmission frames, each of which includes a message data subchannel and a series of transmission subchannels or time slots 51-1, 51-2 and 51-3. The time slots 51-1 through 51-3 are private transmission subchannels of the respective slave stations 1 thorough 3. Each of the time slots is also defined as an acknowledging timing of a corresponding one of the slave stations of a corresponding one of the transmission enable status signals of 23-1 through 23-3 from the master station through the downward data signal line 16. A downward transmission frame is designated in the downward data format 35 by a time period just after a series of time slots 51-1 through 51-3 until the end of anther consecutive series of the time slots 51-1 through 51-3.

An initial operation of data transmission is now described between the master station and the slave station 1 with reference to FIGS. 2 and 3.

When the slave station 1 has data to be transmitted, the internal slave communication device 20-1 of the slave station 1 activates the transmission request status signal 29 as the transmission request signal 45. The transmission request status signal 29 is gated by the transmission request status outgoing timing signal 28 from the upward data outgoing timing generator 25 to be output to the upward data signal line 15. The gated transmission request status signal 29 informs the master station of the slave station 1 in a transmission request status through the upward data signal line 15.

With regard now to the timing diagram of FIG. 3, a transmission request status of the slave station 1 then appears in the same timing as the time slot 50-1 of the upward data format 39 on the upward data signal line 15 in connection with the transmission request outgoing enable signal 40. The transmission request status appears on the time slot 50-1 immediately after a timing 46, in this case, when the transmission request signal 45 is acknowledged or gated by the transmission request status outgoing timing signal 28. As the upward data signal waveform 36 shows, the transmission request signal elements 38 appear on the upward data signal line 15 in the same timing as the time slot 50-1 and also with the following time slots 50-1. Similarly, with regard to the slave station 2 or 3 in a transmission request status, a transmission request status would appear on the upward data signal line 15 in the same timing as the time slot 50-2 or 50-3, respectively, in connection with the transmission request outgoing enable signal 41 or 42.

With regard to the priority operating status 30 of the timing diagram, a series of priority operations of the priority circuit 24 is illustrated by a solid working figure starting with a timing 49 denoting a start of a transmission frame. A series of priority operations is described as follows. The priority circuit 24 receives a plurality of the transmission request signal 22-1 through 22-3 of FIG. 2 input in the master station 119. The priority circuit 24 assigns priority for transmission to one of the slave stations based on the signals through a series of priority operations. When specifying the transmission request signal 22-1 of the slave station 1 as an assignee of the priority for transmission, for example, the priority circuit 24 activates the corresponding transmission enable signal 23-1 of FIG. 2 or the transmission enable signal 31 of FIG. 3.

The priority circuit 24 outputs the transmission enable signal 31 to the downward data signal line 16 in the same timing as the private time slots 51-1 of the slave station 1. Consequently, the transmission enable signal element 34 appears on the downward data signal line 16 in the same timing as the time slot 51-1, through which a transmission enable status is transmitted to the slave station 1.

When the transmission enable signal element 34 has been received from the master station, the slave station 1 activates the upward data outgoing enable signal 43. Concurrently, the slave station 1 outputs the eight-bit message element 37 on the upward data signal line 15 with a frame timing pulse of the message element outgoing timing signal 47 designated by the message outgoing timing 44 in a synchronized manner with the clock signal 48.

Figure 4:
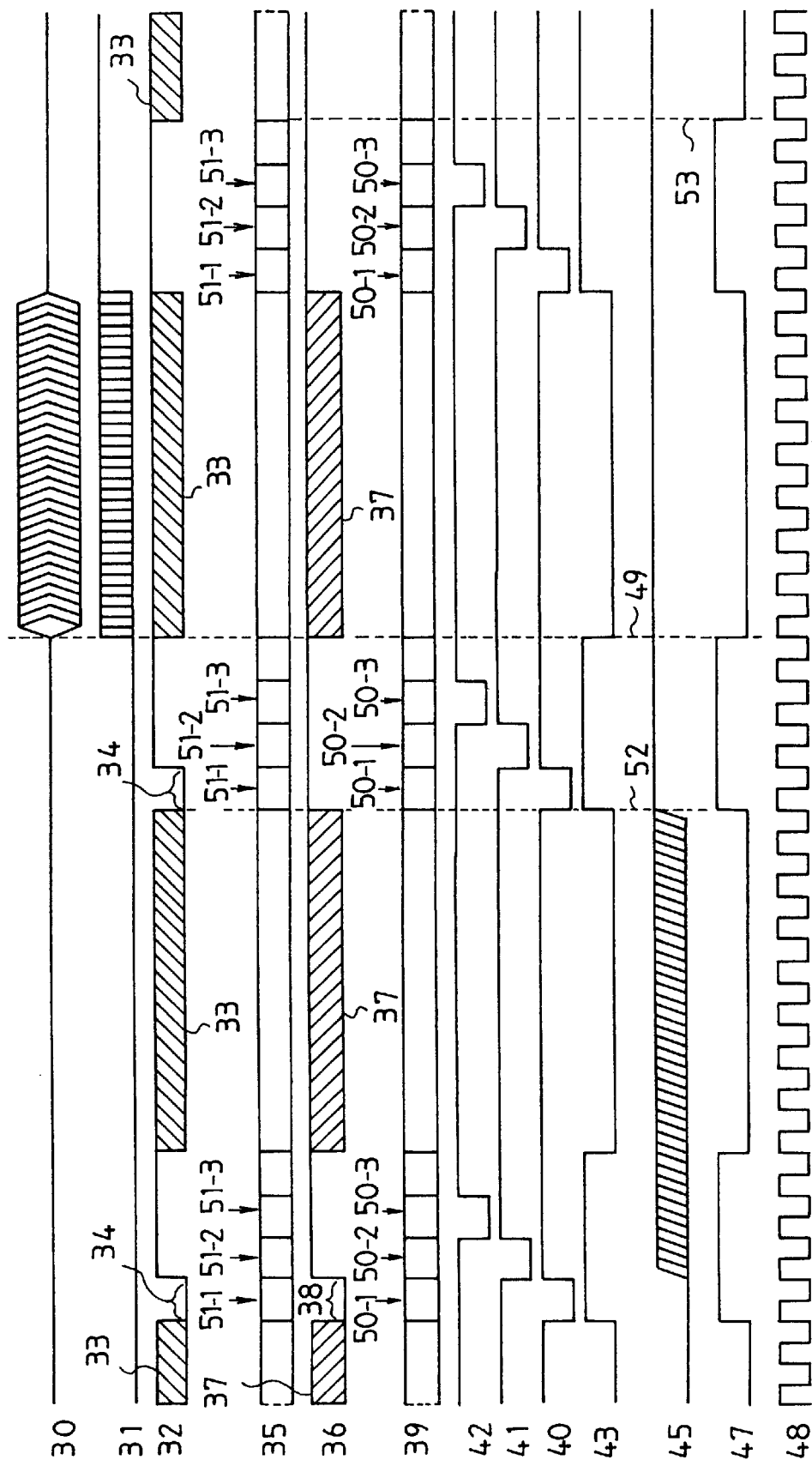
FIG. 4 is a timing diagram illustrating a terminal operation of data transmission between the master and the salve station 1 of FIG. 1 according to the first embodiment.

FIG. 4 is a timing diagram illustrating a terminal operation of data transmission between the master and the salve station 1 of FIG. 3 according to this embodiment. An exemplary data transmission discussed with reference to this timing diagram is a series of operations for terminating a data transmission of the slave station 1 with the master station. Reference numerals of signals and such herein referred to correspond to those of FIG. 3.

Downward data in the downward data format 35 on the downward data signal line 16 of FIG. 2 or 4 are transmitted in a synchronized manner with the cyclic frame signal of the frame signal line 54 of FIG. 1.

A final operation of data transmission is now described between the master station and the slave station 1 in the inventive master-slave data communication system according to this embodiment.

Referring to FIG. 2, in the final course of a data transmission of the slave station 1 with no data left for transmission, the slave communication device 20-1 inactivates the transmission request status signal 29. The inactivated transmission request status signal 29 is output to the upward data signal line 15 with a timing pulse of the transmission request status outgoing timing signal 28 from the upward data outgoing timing generator 25 at the logic gate. FIG. 4 illustrates the acknowledgement of the inactivated transmission request status signal 29 in a timing 52 immediately before the time slot 50-1 of the upward data format 39 on the upward data signal line 15 with reference to the transmission request signal 45 and the transmission request outgoing enable signal 40. Thereby the transmission request signal element 38 from the slave station 1 disappears from the upward data signal waveform 36 of the upward data signal line 15.

With regard to the priority operating status 30 of FIG. 4, a series of priority operations of the priority circuit 24 is illustrated by a solid working figure starting with the timing 49 denoting a start of a transmission frame. A series of priority operations is described as follows. The priority circuit 24 receives a plurality of the transmission request signal 22-1 through 22-3 of FIG. 2 including the inactivated transmission request status signal 29 input in the master station 119. The priority circuit 24 acknowledges and identifies the inactivated signal 29 and cancels the priority for transmission of a corresponding slave station to the inactivated signal 29 through a series of priority operations. When the inactivated signal 29 is of the transmission request signal 22-1 of the slave station 1 as the object for cancellation, for example, the priority circuit 24 inactivates the transmission enable signal 23-1 of FIG. 2 or the transmission enable signal 31 of FIG. 3.

The priority circuit 24 outputs the inactivated signal in the same timing as the private time slots 51-1 of the slave station 1. A priority canceling operation in the priority circuit 24 illustrated by the working figure of the priority operation status 30 is terminated before a series of the time slots 51-1 through 51-3 when the inactivated transmission enable signal 31 is acknowledged. Consequently, the transmission enable signal 34 activated as shown in the data waveform 32 of FIG. 4 of the downward data signal line 16 disappears in the same timing as the time slot 51-1 of a downward data frame starting from the timing 49.

When the disappearance of the transmission enable signal element 34 from the master station has been detected, the slave station 1 stops outputting the upward data message element 37 in a transmission stop timing 53 positioned at a start of message data transmission of another frame based on the message element outgoing timing signal 47.

Thus, the present invention is characterized by inventive arrangement and structure of transmission data in a time-division multiplexed frame transmitted on the upward and downward data signal lines. This reduces the number of internal communication devices in the master station and leads to the reduction of the number of data communication channels in the master-slave data communication system. According to this embodiment, a time-division multiplexed upward data frame includes an upward message element signal and transmission request signals. A time-division multiplexed downward data frame includes a downward message element signal and transmission enable signals. In the inventive transmission frame, data signals are rearranged in a rational manner to eliminate redundant signals arranged in a conventional manner. The master station is provided with the priority circuit for prioritizing a slave station for transmission out of a plurality of slave stations based on the transmission request signals input in the master station. The priority circuit also contributes to the reduction of data communication channels in the master station along with the rearranged rationalized frame. Thus, the inventive point-multipoint data communication system can achieve an effective data transmission with a single master station and a plurality of slave stations via upward and downward data signal lines.

Referring further to the contents or arrangement of the time-division multiplexed transmission frame, each transmission frame consists of a common eight-bit message subchannel and one-bit private subchannels for transmission request/enable signals from/to the respective slave stations. The total number of bits in a time-division multiplexed transmission frame may be ten to 30, depending on the scale of the system or the number of slave stations in the system.

Such a reduction of an overwhelming amount of data transmitted in a frame results in reducing the amount of operation by the frame in the master station. This allows a point-multipoint data communication system to achieve an effective data transmission between a single master station and a plurality of slave stations. As a result of the reduced amount of operation in the system, a possible low transmission speed and a low transmission bit rate or a low clock signal frequency can be used. This enables the system to achieve a long distance transmission of data.

Embodiment 2.

Figure 5:
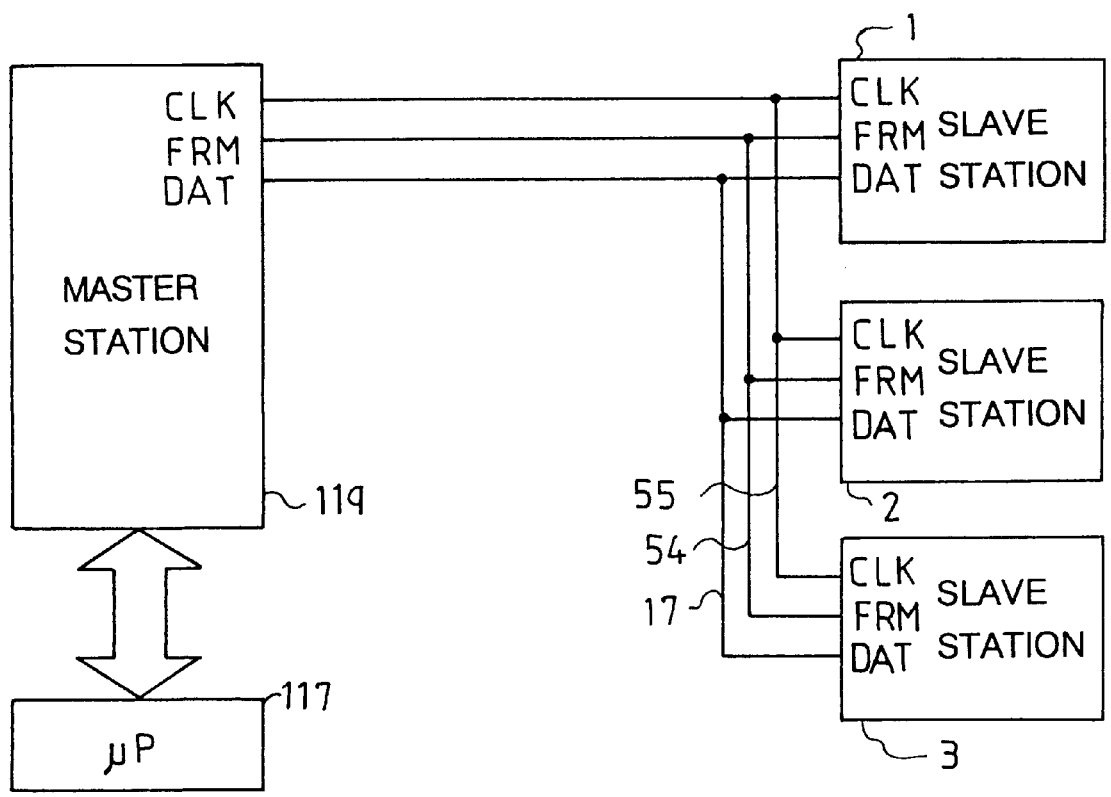
FIG. 5 is a block diagram of a master-slave data communication system according to a second embodiment of the present invention.

FIG. 5 is a block diagram of a master-slave data communication system according to another embodiment of the present invention. FIG. 5 modifies FIG. 1 with a replacement of a single bidirectional data signal line 17 for a set of the upward and downward data signal lines 15 and 16 of FIG. 1. Reference numerals for legends of FIG. 5 correspond to those of FIG. 1.

A second embodiment is directed to data transmission between a master station and a plurality of slave stations, herein referred to is three in the same manner as that of FIG. 3 of the first embodiment in order to pursue a simple discussion, in an inventive master-slave data communication system. According to this embodiment, data transmitted in the system are basically arranged in a time-division multiplexed frame including eight bits of message signals followed by a plurality of, or three here, one-bits of status signals from/to the respective slave stations to/from a master station. A frame format of upward data includes a transmission request signal as a status signal transmitted from a slave station to a master station. A frame format of downward data includes a transmission enable signal to a slave station from a master station.

This embodiment is characterized by a further reduction of data signal lines. The upward and downward signal lines of the previous embodiment are unified to a single common data signal line in a rationalized manner by doubling the transmission speed of each frame bit rate of upward and downward data for a common use, so that both data can share the single data signal line in an advanced time-division multiplexed manner.

In accordance with the doubled bit rate of frame data of this embodiment, the frequency of the clock signal (CLK) also doubles that of the previous embodiment in order to secure the same data rate as that of the previous embodiment.

Figure 6:
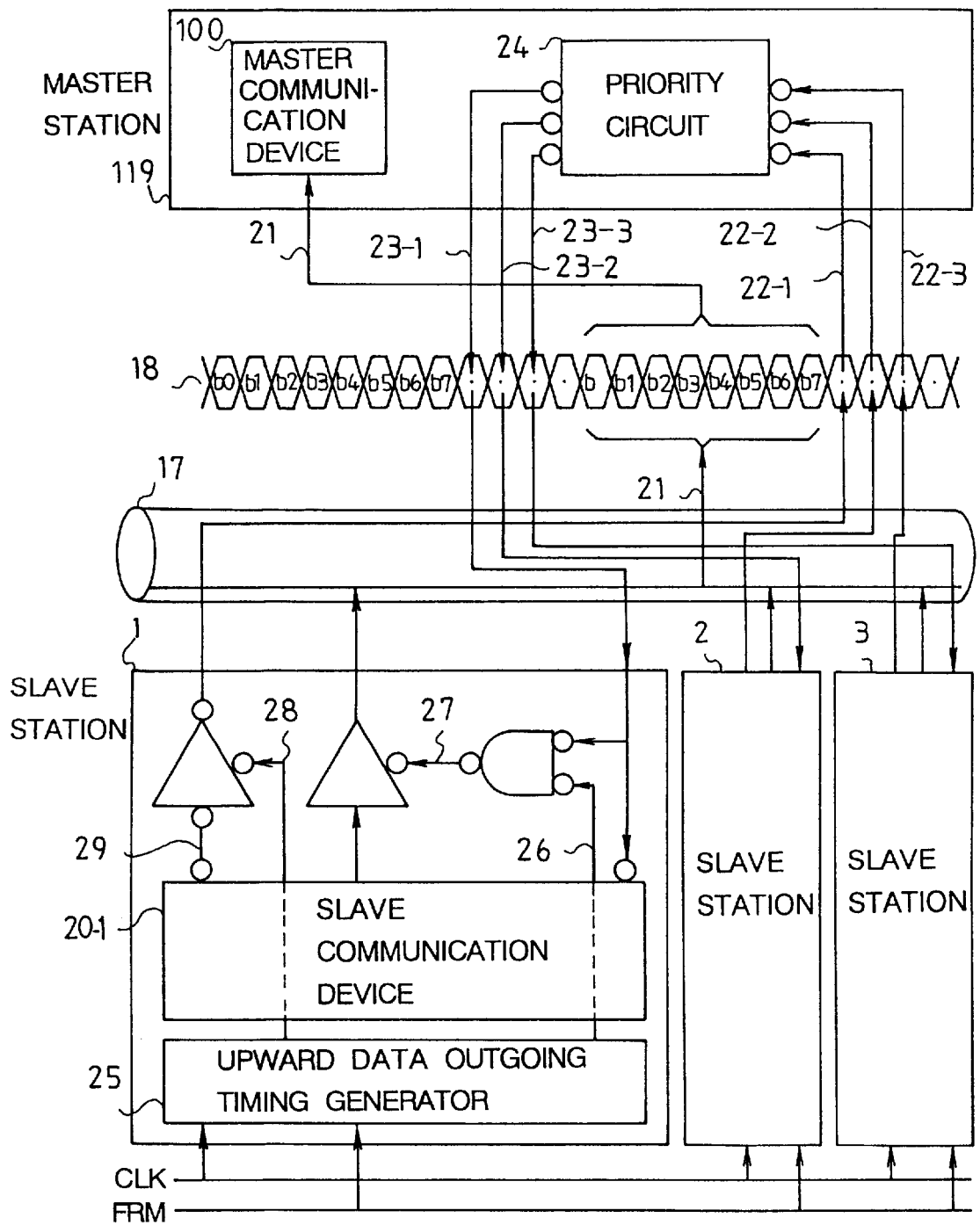
FIG. 6 is a detailed diagram of the master-slave data communication system of FIG. 5 illustrating a transmission frame format of upward and downward data transmitted on the bidirectional data signal line between the master station and the respective slave stations and a relating signaling network based on wired logic in the system of FIG. 5 according to the second embodiment.

FIG. 6 is a detailed diagram of the master-slave data communication system of FIG. 5 illustrating a bidirectional data format 18 of upward and downward data transmitted on the bidirectional data signal line 17 between the master station and the respective slave stations and a relating signaling network based on wired logic in the system of FIG. 5 according to this embodiment.

Figure 7:
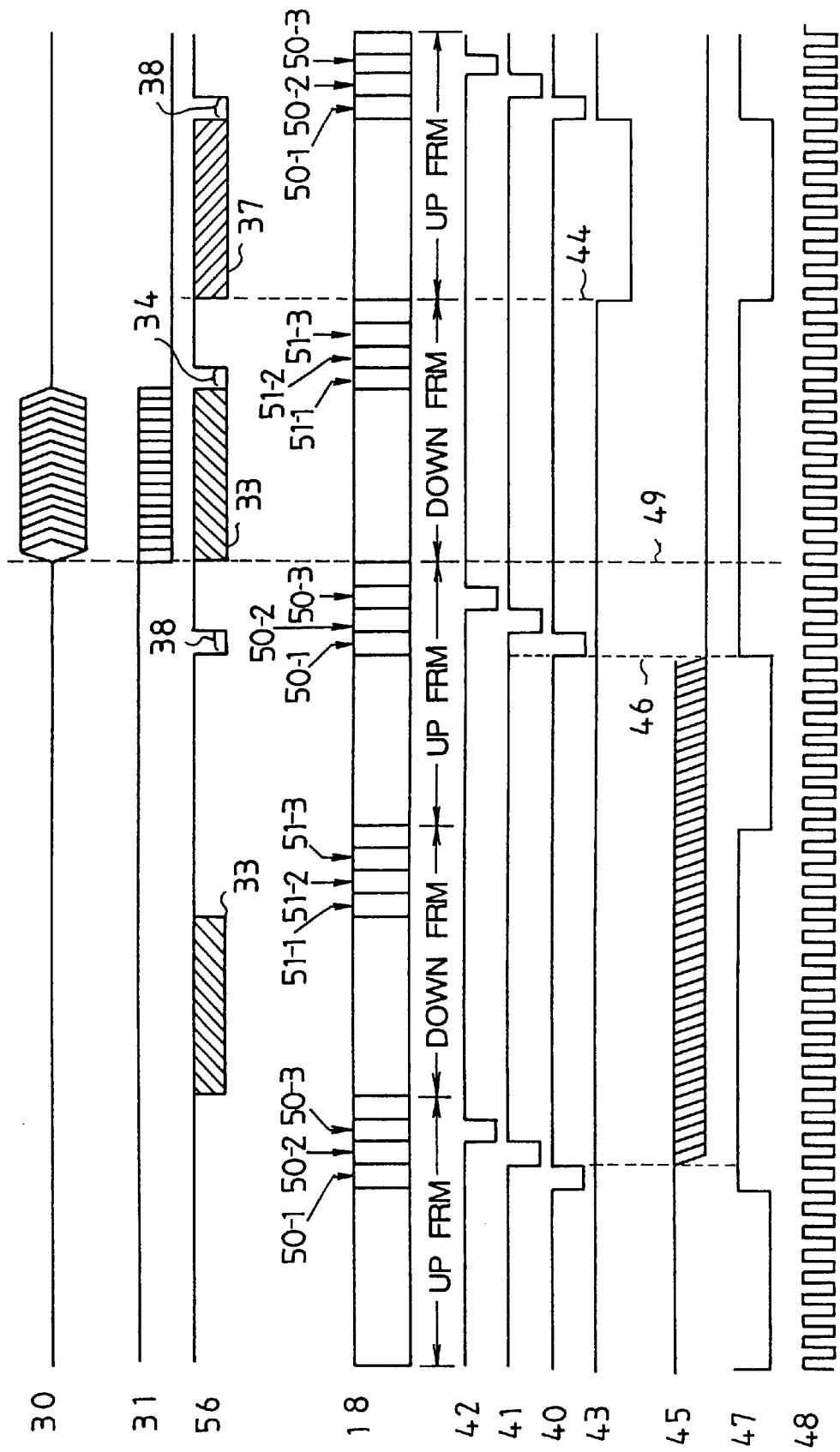
FIG. 7 is a timing diagram illustrating an initial operation of data transmission between the master station and the slave station 1 in the master-slave data communication system of FIG. 5 according to the embodiment.

FIG. 7 is a timing diagram illustrating an initial operation of data transmission in the system of FIG. 5 according to this embodiment. An exemplary data transmission discussed with reference to this timing diagram is a series of operations for transmitting data in the slave station 1 to the master station. Reference numerals of signals and such herein referred to correspond to those of FIG. 3.

Referring to FIG. 7, the timing diagram corresponds to that of FIG. 3, except for the replacement with the bidirectional data format 18 and a bidirectional data signal waveform 56 of the bidirectional data signal line 17 of FIG. 6 for the upward and downward data formats 39 and 35 and the upward and downward data signal waveforms 36 and 32 of the respective upward and downward data signal lines 16 and 15 of FIG. 3.

With reference to FIG. 7, frame signals in the bidirectional data format 18 on the bidirectional data signal line 17 are transmitted in a synchronized manner with a cyclic frame signal on the frame signal line 54 of FIG. 5.

According to FIG. 7, the bidirectional data format 18 is composed of a series of upward and downward data transmission frames, each of which includes a message data subchannel and a series of transmission subchannels or time slots 50-1 through 50-3 or 51-1 through 51-3. The time slots 50-1 through 50-3 are private upward data transmission subchannels of the respective slave stations 1 thorough 3. Each of the time slots is also defined as a transmitting timing of the transmission request status signal 29 from a corresponding one of the slave stations to the master station through the bidirectional data signal line 17. An upward data transmission frame is designated in the bidirectional data format 18 by a time period after a series of time slots 51-1 through 51-3 of downward data until the end of another consecutive series of the time slots 50-1 through 50-3. Therefore, in the frame, upward message signals are transmitted Just after a series of time slots 51-1 through 51-3 of the previous downward data frame.

Frame signals in the bidirectional data format 18 on the bidirectional data signal line 17 are transmitted in a synchronized manner with a cyclic frame signal on the frame signal line 54 of FIG. 5.

The time slots 51-1 through 51-3 are private downward data transmission subchannels of the respective slave stations 1 thorough 3. Each of the time slots is also defined as an acknowledging timing of a corresponding one of the slave stations of a corresponding one of the transmission enable signals from the master station through the bidirectional data signal line 17. A downward data transmission frame is designated in the bidirectional data format 18 by a time period just after a series of time slots 50-1 through 50-3 of upward data until the end of another consecutive series of the time slots 51-1 through 51-3. Downward message data are transmitted in a time period starting when a series of time slots 50-1 through 50-3 of the previous upward data frame ends.

An initial operation of data transmission is now described between the master station and the slave station 1 with reference to FIGS. 6 and 7.

When the slave station 1 has data to be transmitted, the internal slave communication device 20-1 activates and outputs the transmission request status signal 29 to the bidirectional data signal line 17 in the same manner stated in the first embodiment with reference to FIG. 3. The transmission request status signal 29 is output when the transmission request signal 45 from the slave communication device 20-1 of the slave station 1 is acknowledged in the timing 46 in connection with the transmission request outgoing enable signal 40. The transmission request status of the slave station 1 then appears as the transmission request signal element 38 on the bidirectional data signal line 17 in the time slot 50-1 immediately after the timing 46 and also the following time slots 50-1.

Similarly, with regard to the slave station 2 or 3 in a transmission request status, a transmission request status appears on the bidirectional data signal line 17 in the same timing as the time slot 50-2 or 50-3, respectively, in connection with the transmission request outgoing enable signal 41 or 42.

With regard to the priority operating status 30 of the timing diagram, a series of priority operations of the priority circuit 24 is illustrated by a solid working figure starting with a timing 49 denoting a start of a transmission frame. A series of priority operations is described as follows. The priority circuit 24 receives a plurality of the transmission request signal 22-1 through 22-3 of FIG. 6 input in the master station 119. The priority circuit 24 assigns priority for transmission to one of the slave stations through a series of priority operations based on the signals through in the same manner stated in the first embodiment with reference to FIG. 3. With the slave station 1 as an assignee, for example, the priority circuit 24 activates the transmission enable signal 23-1 of FIG. 6 or the transmission enable signal 31 of FIG. 7.

Consequently, the transmission enable signal element 34 appears on the bidirectional data signal line 17 in the same timing as the time slot 51-1, through which the transmission enable status of the master station is transmitted to the slave station 1. A further series of operations is performed in the slave station 1 in an equal manner as those of the first embodiment with reference to FIG. 3.

Figure 8:
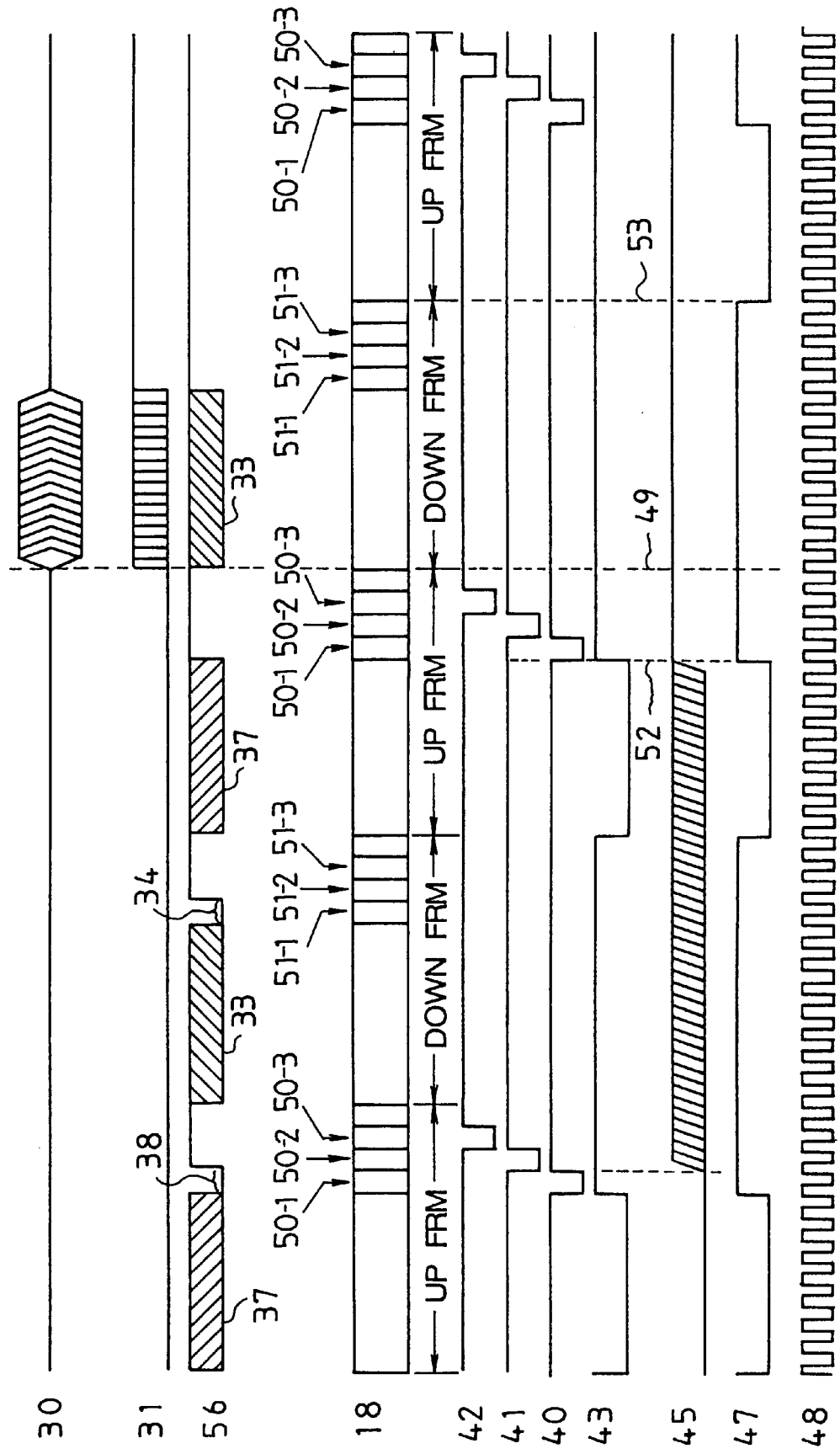
FIG. 8 is a timing diagram illustrating a terminal operation of data transmission in the master-slave data communication system of FIG. 5 according to the second embodiment.
Figure 9:
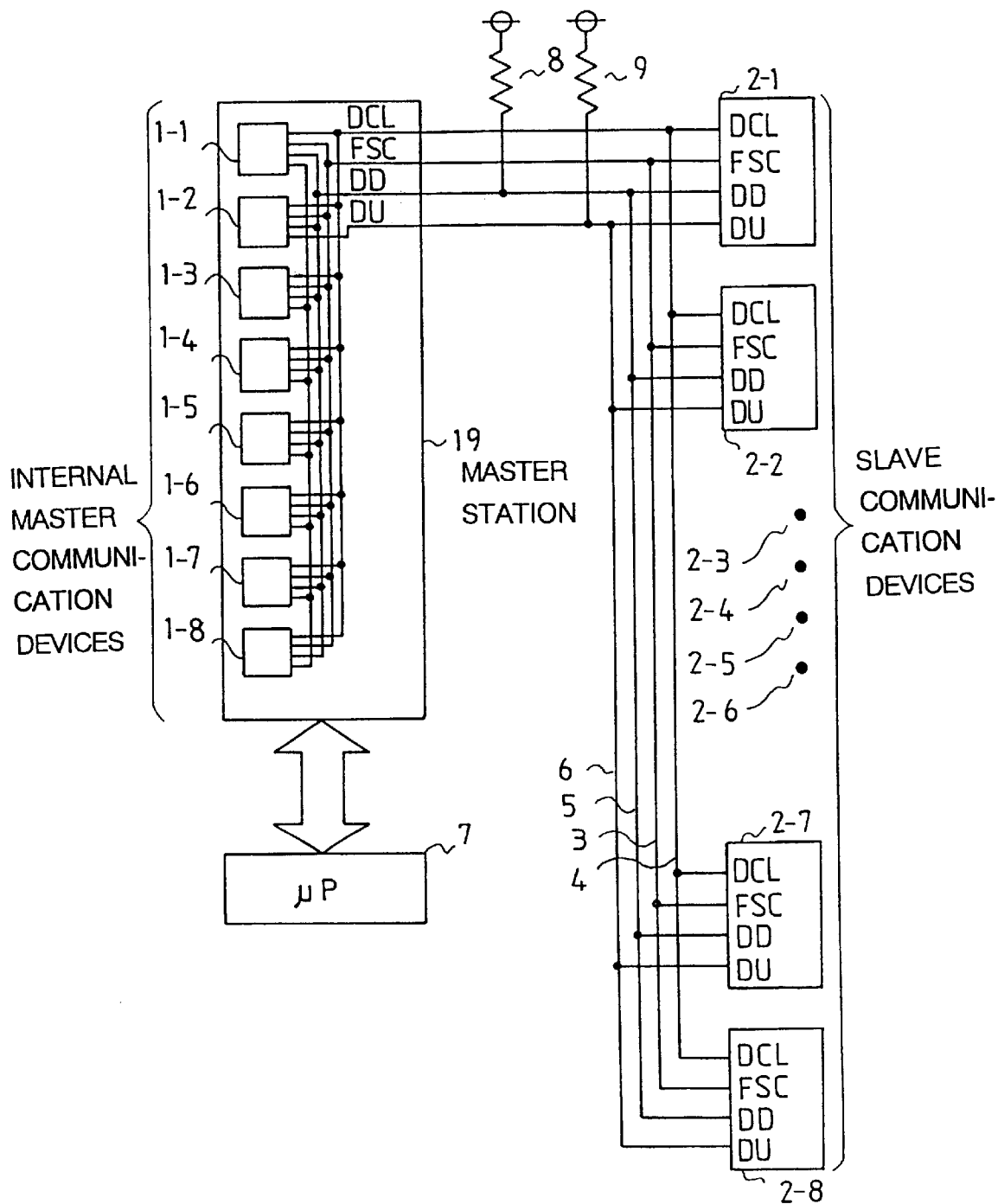
FIG. 9 is a block diagram of an IOM-2 system based conventional point-multipoint data communication system provided with a single master station having a plurality of internal communication devices and a plurality of slave communication devices in the slave stations.
Figure 10:
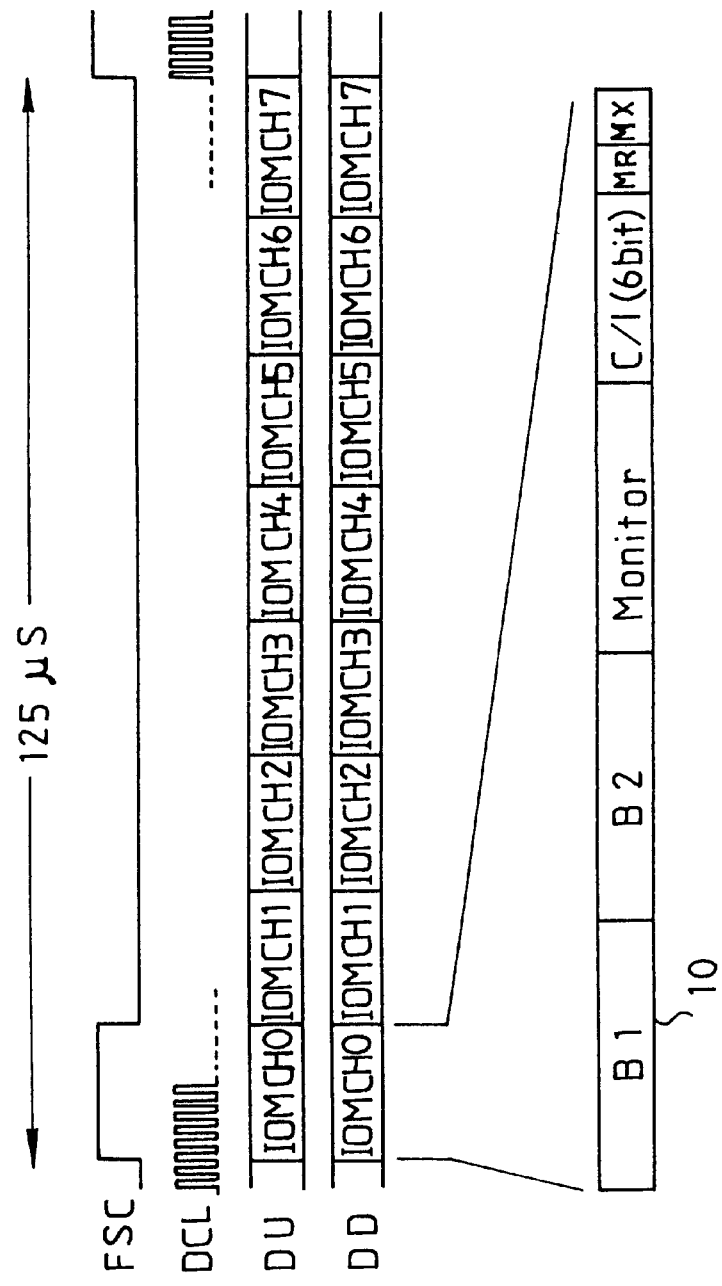
FIG. 10 is a timing diagram illustrating transmission frame formats of upward and downward data in an IOM-2 system based conventional manner.

FIG. 8 is a timing diagram illustrating a terminal operation of data transmission between the master and the salve station 1 of FIG. 5 according to this embodiment. An exemplary data transmission discussed with reference to this timing diagram is a series of operations for terminating a data transmission of the slave station 1 with the master station. Reference numerals of signals and such herein referred to correspond to those of FIG. 7.

With reference to FIG. 8, frame signals in the bidirectional data format 18 on the bidirectional data signal line 17 are transmitted in a synchronized manner with a cyclic frame signal on the frame signal line 54 of FIG. 5.

A final operation of data transmission is now described between the master station and the slave station 1 in the inventive master-slave data communication system according to this embodiment.

Referring to FIG. 6, in the final course of a data transmission of the slave station 1 with no data left for transmission, the slave communication device 20-1 inactivates the transmission request status signal 29 in the same manner stated as that of the first embodiment with reference to FIG. 4. Consequently, the transmission request signal element 38 from the slave station 1 disappears from the bidirectional data signal waveform 56 of the bidirectional data signal line 17 in the time slot 50-1 immediately after the timing 52. The transmission request signal element 38 also disappears from the following time slots 50-1.

With regard to the priority operating status 30 of FIG. 8, a series of priority operations of the priority circuit 24 is illustrated by a solid working figure starting with a timing 49 denoting a start of a transmission frame. A series of priority operations is described as follows. The priority circuit 24 receives a plurality of the transmission request signal 22-1 through 22-3 of FIG. 6 including the inactivated transmission request status signal 29 input in the master station 119. The priority circuit 24 acknowledges and identifies the inactivated signal 29 and cancels the priority for transmission of a corresponding slave station to the inactivated signal 29 through a series of priority operations. When the inactivated signal 29 is of the transmission request signal 22-1 of the slave station 1 as the object for cancellation, for example, the priority circuit 24 inactivates the transmission enable signal 23-1 of FIG. 6 or the transmission enable signal 31 of FIG. 7.

Consequently, the activated transmission enable signal 34, as shown with the data waveform 56 of FIG. 8 of the bidirectional data signal line 17, disappears in the same timing as the time slot 51-1 of a downward data frame starting from the timing 49 in the same manner stated as that of the first embodiment with reference to FIG. 4.

When acknowledged the disappearance of the transmission enable signal element 34 from the master station, the slave station 1 stops outputting the upward data message element 37 in a transmission stop timing 53 positioned at a start of message data transmission of another frame based on the message element outgoing timing signal 47.

According to the present invention, time-division multiplexed data are rearranged in an inventive transmission frame in a rational manner to eliminate redundant signals in a conventional frame resulting in reducing the number of internal communication devices in the master station. This, accordingly, reduces the number of data signal lines and the number of frame bits transmitted, which enables a data signal line to be extended. The transmission frame includes upward/downward message element signals and transmission request/enable signals. According to this specific embodiment, upward and downward data share a single bidirectional signal line. Consequently, the present invention can achieve an effective data communication with the smallest number of data signal lines and a lower data bit rate in a master-slave data communication system.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A master-slave data communication system in which transmission data are exchanged between a master station and a plurality of slave stations, said master-slave communication system comprising:

an upward data signal line coupling said master station to said plurality of slave stations for transmitting upward data arranged on an upward data frame from each of said plurality of slave stations to said master station, said upward data frame including a common upward data message transmission subchannel shared by said plurality of slave stations for transmitting an upward data message signal and a plurality of private transmission request subchannels for said plurality of slave stations to provide a corresponding plurality of transmission request signals in said plurality of private transmission request subchannels; and a downward data signal line coupling said master station to said plurality of slave stations for transmitting downward data arranged on a downward data frame from said master station to each of said plurality of slave stations, said downward data frame including a downward data message signal and a plurality of private transmission enable subchannels for the master station to provide a transmission enable signal in one of the plurality of private transmission enable subchannels in response to at least one of said plurality of transmission request signals, wherein said plurality of slave stations establishes said upward data message signal on said common upward data transmission subchannel on said upward data frame when each of said plurality of slave stations acknowledges said transmission enable signal.

2. The master-slave data communication system of claim 1, wherein said upward data message signal and said plurality of transmission request signals are multiplexed on said upward data frame and said downward data message signal and said transmission enable signal are multiplexed on said downward data frame.

3. The master-slave data communication system of claim 2 further comprising,
   a clock signal line coupling said master station to each of said plurality of slave stations for supplying clock signals; and
   a frame signal line coupling said master station to each of said plurality of slave stations for supplying frame synchronizing signals from said master station to each of said plurality of slave stations.

4. The master-slave data communication system of claim 1, wherein said master station further comprises a single multiple access communication device responsive to said plurality of slave stations.

5. The master-slave data communication system of claim 4, wherein said upward data message signal and said plurality of transmission request signals are time-division multiplexed on said upward data frame transmitted via said upward data signal line.

6. The master-slave data communication system of claim 5, wherein said upward data frame includes a common upward data signal transmission subchannel shared by said plurality of slave stations.

7. The master-slave data communication system of claim 4 wherein said system is operable with an ISDN Oriented Modular Interface.

8. The master-slave data communication system of claim 1, wherein said downward data message signal and said transmission enable signal are time-division multiplexed on said downward data frame transmitted via said downward data signal line.

9. The master-slave data communication system of claim 8, wherein said downward data frame includes a common downward data signal transmission subchannel shared by said plurality of slave stations.

10. The master-slave data communication system of claim 1, wherein said master station includes a priority circuit for selecting one of said plurality of slave stations based on said plurality of transmission request signals transmitted from said plurality of slave stations via said upward data signal line, said plurality of transmission request signals being transmitted on a single upward data frame, and for transmitting said transmission enable signal to a selected one of said plurality of slave stations via said downward signal line.

11. The master-slave data communication system of claim 10, wherein said master station includes a priority circuit for selecting one of said plurality of slave stations based on said plurality of transmission request signals transmitted from said plurality of slave stations via said upward data signal line, said plurality of transmission request signals being transmitted on a single upward data frame, and for transmitting said transmission enable signal to a selected one of said plurality of slave stations via said downward signal line.

12. A method of transmitting data between a master station and a plurality of slave stations with transmission data in a master-slave data communication system, said method comprising the steps of:
   establishing a plurality of transmission request signals on a plurality of private upward data transmission subchannels on an upward data frame by said plurality of slave stations;
   transmitting said upward data frame including said plurality of transmission request signals to said master station via an upward data signal line;
   selecting one of said plurality of slave stations based on said plurality of transmission request signals on said upward data frame input in said master station;
   establishing a transmission enable signal on one of a plurality of private downward data transmission subchannels corresponding to a selected one of said plurality of slave stations on a downward data frame in said master station;
   transmitting said downward data frame including said transmission enable signal to said selected slave station via a downward data signal line;
   establishing a message signal of said transmission data on a common upward data transmission subchannel shared by said plurality of slave stations on said upward data frame when said selected slave station acknowledges said transmission enable signal via a corresponding one of said private downward data transmission subchannels; and
   transmitting said message signal to said master station via said upward data signal line.

13. The method of claim 12, further comprising a step of multiplexing said upward data frame of said upward data frame transmitting step and said downward data frame of said downward data frame transmitting step on a common data signal line.

14. A master-slave data communication system having a master station and a plurality of slave stations, said system comprising:
   a common data signal line coupling said master station to said plurality of slave stations, for transmitting a synchronous time-division multiplexed upward data signal and a plurality of transmission request signals on an upward data frame from each of said plurality of slave stations to said master station, the plurality of transmission request signals being transmitted by the plurality of slave stations respectively on a plurality of private transmission request subchannels, and for transmitting synchronous time-division multiplexed downward data signals and a transmission enable signal on a downward data frame from said master station to one of said plurality of slave stations, said transmission enable signal being transmitted by the master station on one of a plurality of transmission enable subchannels in response to a request from one of said plurality of slave stations,
   wherein said synchronous time-division multiplexed upward data signal is established on a common upward data transmission subchannel shared by said plurality of slave stations on said upward data frame when each of said plurality of slave stations acknowledges said transmission enable signal.

15. The master-slave data communication system of claim 14, wherein each of said plurality of slave stations establishes a transmission request signal and an upward data message signal;
   wherein said master station establishes a downward data message signal;
   wherein said upward data frame includes a common transmission subchannel for said upward data message signal shared by said plurality of slave stations and a plurality of private transmission request subchannels for said transmission request signals; and
   wherein said downward data frame includes a common transmission subchannel for said downward data message signal shared by said plurality of slave stations.

16. A method for communicating between a first slave station of a plurality of slave stations and a master station, said method comprising the steps of:
   supplying clock signals from the master station to each of the plurality of slave stations;

supplying frame synchronization signals for identifying a series of time periods common to the master station and each of the plurality of slave stations;

dividing each of a series of time periods into each of a plurality of private time slots that respectively correspond to said plurality of slave stations, and a data time slot;

activating, by any one or more of said plurality of slave stations including said first slave station, a corresponding one or more of a plurality of transmit request signals in a corresponding one or more of said private time slots of a first time period;

determining a priority of said transmit request signals received by said master station during said first time period;

assigning priority to said first slave station;

activating, by said master station, a transmit enable signal during said first private time slot of a second time period; and transmitting slave data from said first slave station to said master station during said data time slot of said second time period on a common upward data transmission subchannel shared by said plurality of slave stations when said first slave station acknowledges said transmit enable signal.

17. The method of clam 16, wherein the steps of determining and assigning are performed by said master station.

18. The method of claim 16, further including the step of transmitting master data from said master station to one of said plurality of slave stations during said data time slot of said first time period.

19. The method of claim 18, wherein said steps of activating said transmit request signal and transmitting said slave data include asserting an up data signal line that is connected to said master station and each of said slave stations, and wherein said steps of activating said transmit enable signal and transmitting said master data include asserting a down data signal line that is connected to said master station and each of said plurality of slave stations.

20. The method of claim 19, further including the step of transmitting additional master data from said master station to one of said plurality of slave stations on said down data signal line during said data time slot of said second time period.

21. The method of claim 18, wherein said steps of activating said transmit request signal and transmitting said slave data include said slave station asserting a data signal line that is connected to said master station and each of said plurality of slave stations, and wherein said steps of activating said transmit enable signal and transmitting the master data include said master station asserting said data signal line.

22. The method of claim 21, further including the steps of:

determining said first time period and every alternating time period thereafter to be a down data time period, for data to be transmitted from said master station to one of said plurality of slave stations; and determining said second time period and every alternating time period thereafter to be an up data time period, for data to be transmitted from one of said plurality of slave stations to said master station.

23. A master-slave data communication system in which transmission data are exchanged between a master station and a plurality of slave stations, said master-slave communication system comprising:

an upward data signal line coupling said master station to said plurality of slave stations for transmitting upward data arranged on an upward data frame from each of said plurality of slave stations to said master station, said upward data frame including a common upward data message transmission subchannel shared by said plurality of slave stations for transmitting an upward data message signal and a plurality of private transmission request subchannels for said plurality of slave stations to provide a plurality of transmission request signals in said plurality of private transmission request subchannels; and a downward data signal line coupling said master station to said plurality of slave stations for transmitting downward data arranged on a downward data frame from said master station to each of said plurality of slave stations, said downward data frame including a downward data message signal and a transmission enable signal, wherein said plurality of slave stations establishes said upward data message signal on said common upward data transmission subchannel on said upward data frame when each of said plurality of slave stations acknowledges said transmission enable signal.

* * * * *